UNITED STATES PATENT OFFICE.

JOHN COLLINS CLANCY, OF FREEPORT, NEW YORK, ASSIGNOR TO THE NITROGEN CORPORATION, OF PROVIDENCE, RHODE ISLAND, A CORPORATION OF RHODE ISLAND.

PROCESS OF AND MEANS FOR FORMING NITROGENOUS COMPOUNDS.

1,352,176.

Specification of Letters Patent.  Patented Sept. 7, 1920.

No Drawing.   Application filed September 1, 1917. Serial No. 189,290.

*To all whom it may concern:*

Be it known that I, JOHN COLLINS CLANCY, a citizen of the United States, residing at Freeport, in the county of Nassau and State of New York, have invented certain new and useful Improvements in Processes of and Means for Forming Nitrogenous Compounds, of which the following is a specification.

This invention relates broadly to a process of forming nitrogen compounds, and, in its more limited aspects, preferably to the fixation or combination of nitrogen with carbon in the form of hydrocyanic acid, cyanogen gas and derivatives of such carbo-nitrogenous compounds; the fixation or combination also, preferably, being effected catalytically and in substantially a single operation.

One of the principal objects of the novel process herein described is, therefore, to cheapen the cost of production of such substances as those aforesaid, while another and subsidiary object, which bears more especially upon the cost of upkeep of the apparatus involved in the effectuation of the nitrogen fixation, is to provide a process which permits of the fixation or corresponding operation being carried out at a reasonably low temperature; the upper limit of temperature being preferably not in excess of a moderate red heat.

Another object of my invention is to provide a new and particularly efficient catalyzer and in one aspect of said invention, the lyzer and in one aspect of said invention, the steps involved in the production of said catalyzer may be regarded as steps of the process as a whole.

These and other objects will, hence, be hereinafter more especially referred to and the features of importance and novel combinations of steps and elements will be more particularly set forth in the claims appended hereto.

Considering first the mode of forming and nature of the catalyzer or catalyzers, preferred for use in the step or operation of fixing nitrogen in acordance with my process,—I have discovered that several features are of great importance in connection therewith. First, it is extremely desirable that the catalyzer should be of a particularly porous nature such as that hereinafter referred to, in order that the gases which pass therethrough during the nitrogen fixation operation, may freely penetrate and pass out of said catalyzer while at the same time the gaseous stream or streams are so thoroughly divided by their passage through minute conduits in said catalyzer, that substantially all of the molecules thereof must make contact with the walls of said conduits.

I have also discovered that the catalyzer should preferably consist of or comprise a labile substance or compound such as is already carbo-nitrogenous, or which can readily form such a carbo-nitrogenous compound or compounds; and, in general, such preferably porous catalyzers may be formed not alone from carbo-nitrogenous substances, but also from nitrids, amids, or hybrids, if, for example, such hybrids have been derived, or are capable of being derived, primarily from carbo-nitrogenous catalyzers prepared as hereinafter described.

Heretofore, to the best of my knowledge, cyanamids of various metals, such as barium cyanamid, have been formed from their cyanids by the abstraction of carbon therefrom, but I have discovered that such cyanids may be treated with nitrogen, in a novel manner, to convert them to their cyanamids and that the so-formed cyanamid of barium, for example, possesses rather extraordinary characteristics; one of the most striking features about it being the expanded, very porous form of the resulting material.

Thus when, for example, cyanid of barium is slowly heated up to about 400° to 500° C., in an atmosphere of nitrogen a reaction occurs which, I am of the opinion, may be expressed as follows:

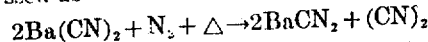

$2Ba(CN)_2 + N_2 + \triangle \rightarrow 2BaCN_2 + (CN)_2$

What probably occurs in this reaction is that one radical CN is replaced by N, with consequent formation of the cyanamid, while cyanogen gas is given off throughout the mass of the cyanamid being formed, with the result that the latter is greatly expanded, much like dough when being baked to bread, except that normally the pores are very much more minute. In fact, after further heating to a still higher temperature, e. g., a dull red heat, the expansion of the material appears to be so complete that most of these minute pores in a given lump or mass interconnect with the result that gases may be passed therethrough with great freedom.

In the foregoing I have assumed that this expanded cyanogen compound is a simple cyanamid; but as to this I cannot be absolutely certain, it being possible that some more complex cyanogen compound than the cyanamid is the actual product. Be that as it may, however, the substance is exceedingly porous and active catalytically when used as hereinafter described; while it furthermore is self-sustaining and hence needs no "support" such as is commonly provided in various catalyzers. In other words, there is no diluent, so to speak; but the entire mass may be a catalytic one. Barium cyanamid, as I hence prefer to term it, is by no means the only substance thus capable of being used as a catalyzer; since various other metals may be substituted for barium. Thus nickel cyanid may be treated with nitrogen at about 400° to 500° C., with production of a catalytically active product.

In like or similar fashion, the catalyst may comprise tungsten, vanadium, uranium, manganese, chromium, titanium, etc.; said catalyst in each such case being preferably a cyanamid of the particular metal or metals selected; although in some cases even the metal itself is available for use as a catalyst.

It should be observed, however, that with the exception of the cyanamid of barium the remaining above specifically mentioned metal cyanamids do not thus so markedly expand during formation; and since I have discovered, further, that a mixture of catalyzers affords even more excellent results, I prefer to mix barium cyanid with the cyanids of, for example, uranium and chromium, so that after treatment with nitrogen as above indicated, the whole mass is properly expanded, porous and, preferably, self-sustaining.

By this expression "self-sustaining", as used herein, I mean, of course, laterally self-supporting, in that a given lump or mass of this substance possesses sufficient coherence to maintain its shape, in contra-distinction to pulverulent substances which are not thus laterally self-supporting.

Care must be exercised in preparing the expanded mass and the cyanid or cyanids from which it is prepared should be heated very gently since otherwise the desired formation will not result. Thus barium cyanid fuses at about 650° C., and it is undesirable to heat it even quite to its fusing point.

After the catalytic product has been obtained, it is cooled in an atmosphere of nitrogen to avoid oxidation thereof and is then ready for use. In appearance it is usually somewhat spongy, although substantially non-resilient, and in color is almost invariably black. When in use as a catalyzer, as hereinafter described, care must be taken to avoid fusing or sintering it, although after having once been formed it may be more highly heated,—usually and depending upon the substances of which it is made up,—than when effecting its formation. I prefer, however, to hold the higher limit of temperature, at which it is used to fix nitrogen in the form of hydrocyanic acid, to about 900° C.; although in some cases this temperature may be exceeded,—depending on the catalyzer employed.

Hydrocyanic acid may, however, still be formed in appreciable quantities at a much lower temperature, e. g., about 400° C.; but preferably the operation now to be described is conducted at a red heat.

Thus,—when at about, for example, the temperature specified, mixed hydrogen, nitrogen and a suitable carbonaceous gas are passed through the pores of the catalyzer, hydrocyanic acid gas will be formed; the following equations being typical:

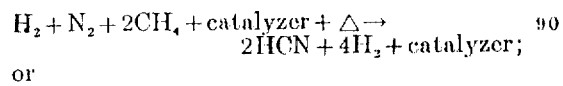

or

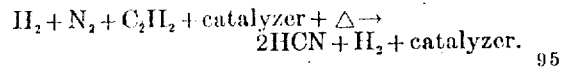

Preferably the hydrocarbons are thus employed as sources of carbon (and also at times as sources of hydrogen); but if barium cyanamid be absent from the catalyzer, carbon monoxid may be as readily used, especially if the catalytic agent or agents be properly distended or supported. Indeed, even if this barium compound be present it is still possible to use carbon monoxid; but at some sacrifice in efficiency of the catalyzer. What happens in this case is that the barium cyanamid is oxidized to barium oxid (BaO); probably taking its oxygen from the water formed or from the carbon monoxid direct. As a catalyst the efficiency of this substance is hence impaired if not destroyed. On the other hand, it has performed a part of its function, having expanded the catalytic mass as a whole, so that the remaining catalytic materials are free to act.

The following equation probably represents what takes place when barium oxid is thus formed;

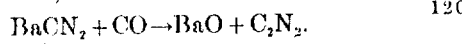

If carbon monoxid, for example, is used, however, there is the advantage that it does not have to be absolutely pure, since traces of water, and indeed other impurities, are in most cases substantially immaterial.

The relatively low temperatures at which non-alkalinous cyanogen compounds, such as HCN or $C_2N_2$, may be synthetically formed by my process is noteworthy on account of the fact that heretofore the synthesis of such compounds has, I believe, always been effected at from 1800° C. to 2500° C. so that the value of the catalytic process herein described,—which permits the desired reaction to occur at temperatures considerably below even 1200° C. (or in other words at from one-third to one-half the temperatures formerly employed, e. g., 600°—900° C.),—becomes at once apparent, from a consideration of this fact alone.

While the synthesis of hydrocyanic acid may thus be brought about at pressures approximating that of the atmosphere, I prefer to operate under pressure; since the efficiency of the reaction is thereby materially increased. In fact, this increase in pressure operates in two beneficial ways. In the first place, the molecules of nitrogen, hydrogen and the gaseous hydro-carbon or other source of carbon, are driven more intimately together and, when passing through the pores of the catalyzer, correspondingly more efficiently in contact with the walls of said pores, whereby a more copious yield results. In the second place, since the higher the temperature the more efficient the reaction,— it is desirable to operate at a fair red heat and the increase in pressure upon the material of the catalyzer permits of appreciable elevation of the temperature while still maintaining the latter within the limit of safety to the catalyzer; since the pressure upon the latter raises its fusion or sintering point.

I hence prefer to operate at pressures ranging from 100 pounds per square inch up to 1000 pounds per square inch, or more, depending upon the limit of cost of the apparatus. By this is meant that in any apparatus in which gas under pressure is heated or into which gases at high temperature and under high pressures are introduced, there is a mechanical limit which is imposed by the nature of the apparatus employed,—and necessarily for a given temperature, as the pressure used becomes increasingly greater, beyond certain obvious limits, the cost of the apparatus becomes more than correspondingly greater.

The hydrocyanic acid so produced,—if in gaseous form, as will normally be the case when operating at a red heat,—may be separated from the gaseous reaction residues or unchanged gases in any suitable manner, as by means of caustic soda or by forming liquid hydrocyanic acid, or a derivative thereof.

As illustrative of the powerful catalytic properties of my improved catalytic material,—whether comprising but one of the indicated substances or as is to be preferred, the peculiarly intimate mixture of a plurality of the same, prepared substantially as aforesaid, or derived from the expanded cyanogen complex mass,—I may point out that if no hydrogen be present in the mixture of nitrogen and carbon supplying gas, supplied to the catalyzer at reaction temperature, hydrocyanic acid will not be formed; but in lieu thereof cyanogen gas will pass off from said catalyzer. When, however, hydrogen is supplied, especially in molecular condition, hydrocyanic acid may be formed as above described.

Aside from the chemical constitution of one or more of these elements of the novel catalytic material, I attribute much of the high catalytic power of the preferred catalyzer or catalytic mixture to its peculiar structure which offers to the gases to be synthesized or combined, contact surfaces of extraordinary extent and especially adapted to ramify, so to speak, the gaseous stream, so as to enable the molecules of the elements to be combined, to more readily make contact therewith.

On the other hand where, for various purposes, catalytic material has been used in pulverulent form, if the mass to be penetrated by the gas is of any material depth, it tends to obstruct the flow of said gas, while if the latter be forced through the powder, it of course tends to displace the latter from its support.

While as per the foregoing, I have described a class of catalytic materials which are capable of formation into a substantially self-supporting structure, which in most cases is to be preferred,—I do not wish to have my invention, in its broader aspects regarded as being limited to these or to their use in the process as a whole; since I am aware of various other agents which are capable of being used as catalyzers for the formation of, for example, hydrocyanic acid.

Thus, by way of illustration, I have discovered that the cyanid of an alkali metal, e. g., potassium or sodium, may be heated to about a red heat or even somewhat lower, together with hydrogen, nitrogen and carbon or a substance or substances to yield one or more of these elements to form a fairly good catalyzer, which, however, should preferably be provided with a support,—in which it is unlike the other cyanogen-complex catalyzers to which I have referred; the alkali metal catalytic compound so produced not being expanded. It may, however, be flowed in thin films over asbestos wool, kieselguhr, coke or the like, to provide a catalytic body of adequate porosity; and when, for example, mixed hydrogen, nitrogen and a suitable carbonaceous gas are passed under pressure and at about a red heat through or in contact with these films, hydrocyanic acid gas will be synthetically produced.

The material from which the catalyzer is to be formed may also be, for example, an amid of a suitable metal. Thus, when hot chromic acid is treated with ammonia gas, there is formed an incandescent mass of what is apparently chromium amid, which sinters, and which, after cooling, may be broken into small particles to form a fair catalyzer; which, however, if so used is by no means comparable with the chromium cyanogen complex catalyzer above mentioned.

A similar and very efficient catalyzer, however, is obtained by substituting tungsten for chromium in the catalytic compound. Thus by treating ammonium tungstate with ammonia at 350° C., a black shiny crystalline mass,—which presumably is tungsten amid,—is formed. This is a catalyzer which when treated at about 850° C. with hydrogen and nitrogen, together with acetylene, carbon monoxid or other suitable carbon supplying gas,—even though the gases employed are not under pressure,— affords a large yield of hydrocyanic acid. The yield of hydrocyanic acid is, moreover, increased by using the gases under pressure.

Again, by way of example, if gaseous ammonia be substituted for nitrogen and hydrogen, a mixture of one part thereof with two parts of acetylene gas may be subjected to a catalyzer of tungsten metal, alone, to afford a copious yield of hydrocyanic acid at about 750° C., especially when the gases are under moderate pressure.

The catalyzer, in view of the above exemplifications may hence be varied greatly, both as regards its structure and initial material,—the metals specified being capable of forming or of being converted into the desired labile valenced compounds.

In like manner other metals than chromium or tungsten are available for incorporation in the catalyzer, as, for example, titanium, vanadium, manganese, uranium, etc., which may be obtained if desired, from various salts or compounds thereof, e. g., hydrids; but which on account of the novel structure of the preferred catalyzer are preferably incorporated thereinto as, or converted therein in situ to, expanded complex cyanogen compounds thereof such as those produced in manner aforesaid.

However, titanium, vanadium, tungsten, uranium and chromium, for example, when prepared as their cyanamids or indeed even as cyanids, in relatively compact masses and without expansion by the barium cyanogen complex or the like, behave excellently as catalyzers for hydrocyanic acid production, especially when operating under higher pressures, as per the foregoing.

In conclusion, I may add that while the production of hydrocyanic acid by mass reaction is of course known, so far as I am aware the use of a true catalyst in this connection has never even been suggested; and certainly not for use in a process of this description where the temperature of the operation is maintained around or below a red heat.

I am also aware that both my preferred catalyzers and the modes of using the same are capable of yielding other products than those specifically referred to herein, so that where, in the appended claims, I do not specifically mention "carbon," for example, but refer to the element to be combined with nitrogen simply as an "element," it will be understood that I do not in such case contemplate limiting myself to carbon. Moreover, generic claims which more particularly concern my novel catalytic material, are intended to cover said materials, no matter how used or modified, except as in some cases otherwise expressly stated in said claims; on account of the extreme adaptability of said material to the formation of derivatives thereof, as hereinbefore described.

Having thus described my invention, what I claim is:

1. The process of producing a carbo-nitrogenous compound which comprises effecting a nitrogen fixing reaction by subjecting a carbo-nitrogenous catalyzer to free nitrogen and to a carbonaceous gas capable of acting as the source of the carbon for the carbo-nitrogenous compound to be formed.

2. The process of producing a carbo-nitrogenous compound which comprises subjecting a gaseous mixture which is under super-atmospheric pressure and in which are present the elements hydrogen, nitrogen and carbon, to contact with a catalyzer capable of synthetically uniting at least the two last mentioned elements, said pressure being in excess of thirty pounds per square inch.

3. The process of producing a nitrogenous compound which comprises subjecting a gaseous mixture which is under super-atmospheric pressure and in which are present the elements hydrogen, nitrogen and carbon, to contact with a catalyzer, in the solid phase, which is capable of synthetically uniting said nitrogen to at least one of the remaining elements aforesaid, said pressure being in excess of 30 pounds per square inch.

4. The process of producing a substance in which is present the radical CN, which comprises synthetically uniting the elements carbon and nitrogen, to form said radical, by subjecting gaseous material which includes said elements to contact with a heated catalytic mass in which is a compound containing carbon united to nitrogen by a plurality of bonds.

5. The process of fixing nitrogen which comprises synthetically uniting free nitrogen to at least one other element through the intermediacy of a catalytically active derivative of a cyanogen compound and which mass has been expanded by the generation of gas therein during its conversion from said cyanogen compound.

6. The process of fixing nitrogen which comprises synthetically uniting free nitrogen to at least one other element through the intermediacy of a catalytically active derivative of a cyanogen compound and which mass has been expanded by the generation of gas therein.

7. The process of fixing nitrogen which comprises synthetically uniting free nitrogen to carbon and hydrogen, through the intermediacy of a catalytically active derivative of a cyanogen compound and which mass has been expanded by the generation of gas therein.

8. The process of producing a catalyzer for nitrogen fixation and the like, which comprises gaseously distending a mass of catalyzer-forming carbonaceous material by treating said material to effect therewith a gas evolving reaction, in which said material participates to yield a part only of its carbon content for the formation of said gas and to form a spongy substance the pores of which may readily be traversed by gases.

9. The process of producing a catalyzer for nitrogen fixation and the like, which comprises treating material containing carbon and nitrogen united by a plurality of bonds, to liberate cyanogen therefrom in gaseous form while said material is in the solid phase but in plastic condition, and permitting the gaseous cyanogen to expand the plastic residues during the evolution of said gas, to open a multiplicity of pores throughout said material, whereby to impart catalytic properties to said material by the separation of cyanogen therefrom while simultaneously utilizing the gaseous cyanogen during the course of its said separation, as a means for imparting a porous form to the catalytic material.

10. The process of producing a catalyzer which comprises effecting a reaction, in part at least through the intermediacy of heat, within a mass of material which includes a carbo-nitrogenous compound, to liberate a carbo-nitrogenous gas therefrom and form a second carbo-nitrogenous compound which possesses the desired catalytic properties.

11. The process of producing a porous catalyzer, which comprises gaseously expanding a reactive mass into a sponge-like substance by the evolution of gas in said mass while simultaneously rendering constituents of said mass catalytically active, said substance including as an essential constituent thereof an element which is also an essential constituent of said gas.

12. The process of producing a catalyzer which comprises mixing together a plurality of carbo-nitrogenous substances one of which is capable of being expansively reacted upon and another of which is less thus capable, said other, however, being capable of conversion into an active catalyst, subjecting the mixture to treatment, including heat, to expansively react upon said first mentioned substance and to produce said active catalyst in distended form, in part at least through the intermediacy of the expansive force generated and exerted in said first mentioned substance as the latter is being expansively reacted upon.

13. The process of producing a catalyzer which comprises mixing together barium cyanid and another cyanid which is capable of conversion into an active catalyst, subjecting the mixture to heat, in an atmosphere of nitrogen to form an expanded barium-cyanogen complex and to convert said other cyanid to said active catalyst in distended form, in part at least through the intermediacy of the expansive force generated and exerted in said barium cyanid as the latter is being converted to said expanded complex.

14. The process of producing a catalyzer which comprises mixing together a plurality of metal cyanids and reacting upon the mixture with a nitrogenous reagent to form an expanded mass of complex cyanogen compounds.

15. The process of producing a nitrogen-fixing catalyzer which comprises treating barium cyanid to effect a substitution of nitrogen for a part of the cyanogen content of said cyanid at a temperature below 650° C.

16. The process of producing a nitrogen-fixing catalyzer which comprises treating an alkaline earth metal cyanid to effect a substitution of nitrogen for a part of the cyanogen content of said cyanid at a temperature below 650° C.

17. The process of producing a substance which comprises converting a simple metal cyanid to a cyanogen derivative thereof, by reacting upon said cyanid to liberate carbon therefrom in combination with nitrogen at a temperature below 650° C.

18. The process of producing a catalyst which comprises rendering a mass of carbo-nitrogenous catalyst-yielding material porous by evolving a carbonaceous gas therewithin, in part at least from the substance thereof.

19. The process of producing hydrocyanic acid which comprises subjecting mixed ammonia and acetylene gas to contact with a reaction-effecting catalyzer at a temperature approximating a red heat.

20. The process of producing a catalyst which comprises rendering a mass of carbo-nitrogenous catalyst-yielding material porous by evolving a nitrogenous gas therewithin, in part at least from the substance thereof and allowing said gas to act expansively to open up pores in said material, then cooling said material to reduce the plasticity thereof and preserve said pores.

21. A gaseously expanded, catalytically-active carbo-nitrogenous substance.

22. A catalyzer which comprises a derivative of an unfused gaseously expanded cyanogen compound, the expanded structure of which is preserved in said derivative.

23. As an article of manufacture, a spongy, self-supporting catalytically active derivative of a cyanogen compound.

24. The process of producing a carbo-nitrogenous compound which comprises synthetically forming said compound through the intermediacy of a catalytically active, cyanid derivative produced in an atmosphere of nitrogen.

25. The process of producing a carbo-nitrogenous compound which comprises effecting a reaction between substances in the gaseous state, elements of which are capable of combining with carbon to yield said compound, through the intermediacy of carbo-nitrogenous material, by bringing said substances, while intimately mixed, into contact with said material, and supplying carbon to said material to replace that removed from said material by said reaction.

26. The process of producing hydrocyanic acid which comprises synthetically and catalytically combining hydrogen, carbon and nitrogen at a temperature above 500° C. through the intermediacy of a nitrogenous substance.

27. The process of producing hydrocyanic acid which comprises uniting the elements of said acid through the intermediacy of a fusible non-metallic catalyzer at a temperature below that at which said catalyzer fuses.

28. The process of producing hydrocyanic acid which comprises uniting the elements of said acid synthetically while in gaseous condition, through the intermediacy of a fusible catalyzer, at a temperature below the sintering point of said catalyzer but above 500° C.

29. The process of producing hydrocyanic acid which comprises uniting the elements of said acid synthetically while in gaseous condition, through the intermediacy of a fusible catalyzer, at a temperature below the sintering point of said catalyzer, and while said elements are under pressure.

30. The process of producing a nitrogen-fixing catalyzer from carbo-nitrogenous material, which comprises effecting a reaction to reduce the carbon content of said material by combining carbon thereof with nitrogen to form a gaseous carbo-nitrogenous substance.

31. The process of producing hydrocyanic acid which comprises subjecting a gaseous mixture, one of the elements of which is hydrogenous in character and another of which is a hydro-carbon, to contact with a reaction-effecting catalyst heated to a temperature above 500° C.

In testimony whereof I have affixed my signature, in the presence of two witnesses.

JOHN COLLINS CLANCY.

Witnesses:
 GEO. P. GERFIN,
 FRANCIS G. SMITH.